Patented Aug. 26, 1930

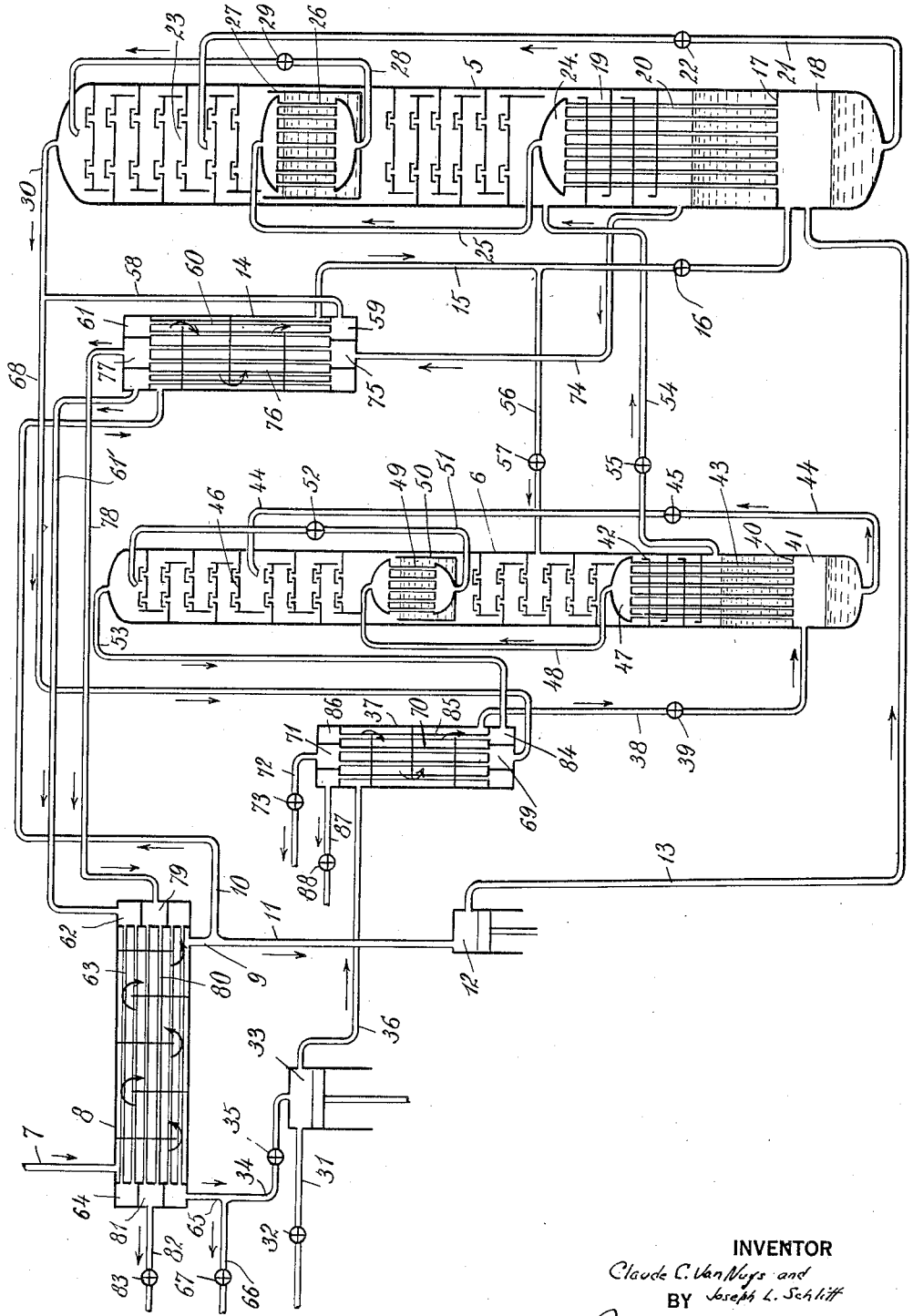

1,774,462

UNITED STATES PATENT OFFICE

CLAUDE C. VAN NUYS, OF CRANFORD, AND JOSEPH L. SCHLITT, OF ELIZABETH, NEW JERSEY, ASSIGNORS TO AIR REDUCTION COMPANY, INCORPORATED, OF NEW YORK, N. Y., A CORPORATION OF NEW YORK

METHOD OF AND APPARATUS FOR SEPARATING THE CONSTITUENTS OF GASEOUS MIXTURES

Application filed October 23, 1926. Serial No. 143,596.

This invention relates to the separation of the constituents of gaseous mixtures, and particularly to a method and apparatus permitting the recovery of two constituents of such a mixture in a substantially pure condition. The invention can be utilized for the recovery of oxygen and nitrogen from the atmosphere and for the treatment of other gaseous mixtures in which the constituents bear similar relations.

To more clearly indicate the nature of the invention it will be discussed hereinafter more especially with relation to the separation of oxygen and nitrogen from air. The recovery of oxygen and nitrogen by liquefaction is practiced commercially on a large scale and the usual methods and apparatus employed for this purpose are well known. The air is compressed, purified and cooled and is then liquefied. The liquid is subjected to rectification whereby the more volatile constituent, nitrogen, is separated from a liquid containing oxygen. The oxygen liquid is then vaporized to produce the oxygen product. Argon, which is present in the proportion of about 1% in the atmosphere, may be removed with the oxygen or nitrogen or it can be recovered separately by the application of a special procedure adapted for that purpose. The presence and separation of argon is not a matter of material importance in connection with the present invention. The other constituents of the atmosphere are present in such relatively small proportions as not to affect the invention.

In the separation of oxygen and nitrogen by rectification of a liquid it has not been possible to recover both constituents in a substantially pure condition. Owing to the nature of the operation and of the character istics of the gases it is necessary to evaporate some of the oxygen in order to ensure the complete absence of nitrogen from the liquid produced by the rectification or, on the other hand, to liquefy some of the nitrogen so that the nitrogen product may be free from oxygen. The rectification may be conducted in either way to produce one of the constituents in a substantially pure form.

It is the object of the present invention to provide a method of and apparatus for separating the constituents of gaseous mixtures whereby two of the constituents can be recovered economically in substantial purity. The invention permits the continuous withdrawal of two constituents of a gaseous mixture and affords consequently an economical source thereof.

Other objects and advantages of the invention will be apparent as it is better understood by reference to the following specification and accompanying drawing in which a preferred form of apparatus capable of use in applying the invention is illustrated diagrammatically. Details of the apparatus which are well known to those skilled in the art are emitted for the purpose of clarity.

In carrying out the invention the gaseous mixture, after compression, purification and cooling in the usual way, is subjected to liquefaction and rectification. The primary rectification is conducted so as to produce a liquid consisting of the less volatile constituent of the mixture in substantial purity, that is to say, if air is treated the rectification is controlled to produce a pure oxygen liquid which is subsequently vaporized to provide one of the products of the operation. In so conducting the rectification the effluent is contaminated necessarily with a considerable proportion of oxygen which leaves the top of the rectification column with the nitrogen which is separated by the rectification.

To accomplish the purpose of the invention another portion of the gaseous mixture or a part of the effluent from the primary rectification is compressed to a lower pressure and after cooling is subjected to liquefaction and an auxiliary rectification which is regulated so as to produce an effluent consisting of the more volatile constituent and a liquid which contains the less volatile constituent and is contaminated necessarily with a considerable proportion of the more volatile constituent. The pure effluent consisting, for example, of nitrogen, is withdrawn from the auxiliary rectification as one of the products of the operation. The impure liquid is evaporated in liquefying the portion of the gaseous mixture or of the effluent from the primary rectification which enters the auxiliary column and the vapor containing oxygen, for example, with some nitrogen, is introduced at an appropriate level in the primary rectification, thus affording an additional source of the less volatile constituent, for example, oxygen which as the result of the rectification accumulates with the pure liquid and is vaporized eventually as one of the products. The nitrogen in the impure vapor which is delivered to the primary rectification escapes eventually with the effluent therefrom and is discharged or returned in part to the auxiliary rectification.

To maintain the refrigeration balance in the system the gaseous mixture entering the auxiliary rectification can be cooled by heat exchange with a cold product of the primary rectification. Moreover, a portion of the liquid which is produced in the usual liquefier and intended for the primary rectification can be diverted and introduced at an appropriate level in the auxiliary rectification, thus ensuring the maintenance of the required volume of liquid therein.

In the operation as described it is possible to obtain substantially all of the less volatile constituent in the gaseous mixture which is introduced to the primary and auxiliary columns and at the same time to secure a large volume of the more volatile constituent at a cost which only slightly exceeds the cost of operating a method for the production of only one of the constituents in substantial purity. Since both constituents are recovered in a substantially pure condition, they can be utilized for all of the numerous purposes for which such products are adapted.

The invention is of general application in liquefaction systems such as are utilized for the commercial production of oxygen and nitrogen from the atmosphere, but it will be described hereinafter with reference to the drawing which shows a modified form of apparatus employing the principles of expansion with external work which characterizes one of the well known liquefaction systems.

Referring to the drawing 5 and 6 indicate respectively the primary and auxiliary columns. The gaseous mixture to be treated may be compressed and purified in the usual way and is delivered then through a pipe 7 to an exchanger 8 wherein it is cooled by heat exchange with products of the operation as hereinafter described. The gaseous mixture escapes through a pipe 9 which is divided into branches 10 and 11. The branch 11 conveys the gaseous mixture to an expansion engine or turbine 12 where it is expanded with external work and thereby cooled. The cooled expanded mixture is delivered by a pipe 13 to the column 5. The balance of the gaseous mixture passes through the pipe 10 to a liquefier 14 wherein it is subjected to heat exchange at its initial pressure with cold products of the operation as hereinafter described and is thus substantially liquefied. The liquid is delivered through a pipe 15 controlled by a valve 16 to the column 5.

The column 5 is divided by a partition 17 into a liquid compartment 18 and a vaporizing and rectifying compartment 19. The gaseous mixture from the engine or turbine 12 and the liquid from the liquefier 14 enter the compartment 18. The gaseous mixture passes upwardly through a plurality of tubes 20 in heat exchange relation with liquid accumulated in the bottom of the compartment 19 and is thus subjected to selective liquefaction. The liquid formed returns through the tubes in accordance with the well known principles of "backward return," being thereby enriched in the less volatile constituent of the gaseous mixture. The liquid from the tubes joins the liquid from the liquefier 14 and the combined liquids are delivered through a pipe 21 and pressure-reducing valve 22 to an intermediate section of the compartment 19. The liquid flows downwardly over trays 23 of the usual form employed in rectification columns and by contact with the vapors rising through the column the liquid loses the more volatile constituent while it is continuously enriched in the less volatile constituent until it finally accumulates in the bottom of the compartment 19 as a liquid consisting of the less volatile constituent in substantial purity.

The residual unliquefied gas in the tubes 20 enters a header 24 and passes thence through a pipe 25 to a liquefier consisting of a plurality of tubes 26 which are surrounded by a liquid in a receptacle 27 placed at an intermediate point in the compartment 19. The residual gas is liquefied in the tubes 26 and the liquid produced is delivered through a pipe 28 and pressure-reducing valve 29 to the uppermost part of the compartment 19 where it flows downwardly over the trays 23 in contact with the rising vapors and joins eventually the liquid introduced through the pipe 21. The liquefied residual gas which, in case air is treated, is substantially pure nitrogen, forms the "reflux" and ensures the separation of the less volatile constituent, for example, oxygen from the rising vapors during the rectification. The operation is so controlled as to permit only the less volatile constituent to reach the lower part of the compartment 19 and the vapors constituting the effluent from the rectification escape through a pipe 30 at the top of the column and consist, for example, of all of the nitrogen originally present in the gaseous mixture with some oxygen which is unavoidably withdrawn with the nitrogen.

To produce the other product of the operation a portion of the gaseous mixture, for example, air, is introduced through a pipe 31 controlled by a valve 32 to an auxiliary compressor 33. The gaseous mixture may be mixed with or replaced by a portion of the effluent from the primary rectification which enters the compressor through a pipe 34 controlled by a valve 35. After compression to a pressure somewhat lower than that employed in compressing the gaseous mixture for the primary separation, the gaseous mixture is delivered through a pipe 36 to an exchanger 37 wherein it is subjected to heat exchange with cold gaseous products as hereinafter described and is partially liquefied. The liquid and the remaining gaseous mixture is delivered from the exchanger through a pipe 38 controlled by a valve 39 to the column 6.

The column 6 is divided by a partition 40 into a liquid compartment 41 and a vaporizing and rectifying compartment 42. The gaseous mixture entering the compartment 41 passes upwardly through a plurality of tubes 43 and is subjected therein to partial liquefaction with "backward return" and consequent enrichment of the liquid in the less volatile constituent. The liquid accumulated in the compartment 41 is delivered through a pipe 44 and pressure-reducing valve 45 to an intermediate section of the compartment 42 and passes downwardly over trays 46 therein in contact with the vapors rising through the column. The more volatile constituent of the liquid is vaporized and ascends through the column while the liquid descends and finally accumulates at the bottom of the compartment 42 about the tubes 43. The unliquefied residual gas in the tubes 43 is delivered to a header 47 and passes thence through a pipe 48 to a condenser consisting of a plurality of tubes 49 which are surrounded by liquid in a receptacle 50 placed at an intermediate point in the compartment 42. The residual gas is liquefied in the tubes 49 and is delivered through a pipe 51 and pressure-reducing valve 52 to the uppermost part of the compartment 42 and flows downwardly over the trays 46 therein until it joins the liquid which is introduced through the pipe 44. The liquefied residual gas forms the "reflux" which ensures the separation of the less volatile constituent from the rising vapors and in this rectification the operation is conducted so as to separate all of the less volatile constituent, thereby producing an effluent consisting of the more volatile constituent in substantial purity which escapes through a pipe 53 at the top of the column.

The liquid descending through the column and accumulating at the bottom of the compartment 42 consists, in case air is treated, of impure oxygen containing a substantial proportion of nitrogen. The liquid is vaporized by heat exchange with the gaseous mixture in the tubes 43 and the vapor is withdrawn through a pipe 54 controlled by a valve 55 and is delivered to the compartment 19 of the primary column 5 at a point where its composition is similar to that of the vapors rising through the primary column. The vapor is thus subjected to the primary rectification, together with other vapors rising through the primary column, with the result that the oxygen constituent is separated and joins the descending liquid to produce the pure liquid product of the primary rectification while the nitrogen constituent continues upwardly through the column and escapes with the effluent from the primary rectification. A portion of the refrigeration which is withdrawn from the auxiliary column by the delivery of vapor therefrom to the primary column can be returned by diverting a portion of the liquid from the liquefier 14 through a pipe 56 controlled by a valve 57 and introducing the liquid to the compartment 42 of the auxiliary column 6 at a point where the descending liquid has a similar composition. This liquid from the primary liquefier 14 is rectified in the auxiliary column and the nitrogen therefrom rises through the column to become a part of the effluent while the oxygen with a portion of the nitrogen joins the impure liquid which accumulates at the bottom of the compartment 42.

The effluent from the primary rectification escaping through the pipe 30 is divided and a portion thereof is delivered through a pipe 58 to a compartment 59 at one end of the exchanger 14. It passes through tubes 60 of the exchanger to a compartment 61 at the opposite end thereof. It is delivered thence through a pipe 61' to a compartment 62 at one end of the exchange 8 and passes through tubes 63 thereof to a corresponding compartment 64 at the opposite end of the exchanger. The effluent escapes through a pipe 65 and all or a portion thereof may be delivered to the pipe 34 leading to the auxiliary compressor 33. The balance, if any, is delivered through a pipe 66 controlled by a valve 67 and may be discharged to the atmosphere or stored for any suitable use. A portion of the effluent from the primary rectification passes through a pipe 68 to a compartment 69 at one end of the exchanger 37 and passes through tubes 70 therein to a corresponding compartment 71 at the opposite end of the exchanger. It escapes thence through a pipe 72 controlled by a valve 73 and may be discharged to the atmosphere or delivered to any suitable receptacle.

The vapor produced in the lower part of the compartment 19 of the column 5 is withdrawn through a pipe 74 and is delivered to a compartment 75 at one end of the exchanger 14. It passes through tubes 76 therein to a compartment 77 at the opposite end of the exchanger. It is delivered thence through a pipe 78 to a compartment 79 at one end of the exchanger 8 and passes through tubes 80 therein to a compartment 81 at the opposite end of the exchanger from which it escapes through a pipe 82 controlled by a valve 83. This is one of the products of the operation, for example, oxygen, and it is consequently conveyed through the pipe 82 to a suitable storage receptacle.

The effluent from the auxiliary rectification is delivered through a pipe 53 to a compartment 84 at one end of the exchanger 37 and passes through the tubes 85 of the exchanger to a compartment 86 at the opposite end thereof from which it is delivered through a pipe 87 controlled by a valve 88. This is likewise one of the products of the operation, for example, nitrogen, and the gas is conveyed, therefore, to a suitable storage receptacle.

It will be noted that in addition to the refrigeration supplied to the auxiliary column by the liquid delivered from the liquefier 14, the auxiliary exchanger 37 is cooled by the effluent from the primary rectification. Since the gaseous mixture entering the auxiliary column 6 passes through the liquefier it is possible to thus maintain the necessary low temperature in the auxiliary column. The amount of liquid supplied to the auxiliary column and the amount of the effluent which passes through the auxiliary liquefier can be regulated to maintain a proper refrigeration balance in the system and to ensure the smooth and efficient operation thereof.

The method and apparatus as described can be applied to existing installations such, for example, as those employed for the production of oxygen for industrial uses. By the addition of the auxiliary column and at a slightly increased expense for compression of the gaseous mixture supplied to this column, it is possible to recover large quantities of pure nitrogen concurrently with the production of oxygen of high purity. The use of the auxiliary column affords an additional source of oxygen from the vapors produced in the auxiliary column and delivered to the primary rectification. The quantity of oxygen, for example, which can be recovered as the result of the joint operation of the two columns is thereby increased and the added production of oxygen together with the volume of nitrogen recovered permits the operation of the system economically.

Various changes may be made in the details of operation and in the form and arrangement of the apparatus employed without departing from the invention or sacrificing any of the advantages thereof.

We claim:—

1. The method of separating the constituents of gaseous mixtures, which comprises rectifying a liquid containing the constituents of the gaseous mixture to form a liquid consisting of one of the constituents in substantial purity, subjecting another liquid containing the effluent from the primary rectification and an added quantity of the original gaseous mixture to an auxiliary rectification to separate one of the constituents as a gas in substantial purity, discharging all of the effluent from the auxiliary rectification, vaporizing the liquid product of the auxiliary rectification and introducing the resulting vapor in the primary rectification.

2. The method of separating the constituents of gaseous mixtures, which comprises compressing, cooling and liquefying the gaseous mixture, subjecting a portion of the liquid to a primary rectification to form a liquid consisting of one of the constituents in substantial purity, subjecting another liquid containing the constituents of the gaseous mixture to an auxiliary rectification to separate one of the constituents as a gas in substantial purity, introducing the remaining portion of the first mentioned liquid to the auxiliary rectification, vaporizing the liquid product of the auxiliary rectification and introducing the resulting vapor to the primary rectification.

3. The method of separating the constituents of gaseous mixtures, which comprises compressing, cooling and liquefying the gaseous mixture, subjecting a portion of the liquid to a primary rectification to form a liquid consisting of one of the constituents in substantial purity, subjecting another liquid containing the effluent from the primary rectification to an auxiliary rectification to separate one of the constituents as a gas in substantial purity, introducing the remaining portion of the first mentioned liquid to the auxiliary rectification, vaporizing the liquid product of the auxiliary rectification and introducing the resulting vapor to the primary rectification.

4. The method of separating the constituents of gaseous mixtures, which comprises compressing, cooling and liquefying the gaseous mixture, subjecting a portion of the liquid to a primary rectification to form a liquid consisting of one of the constituents in substantial purity, subjecting another liquid containing the effluent from the primary rectification and an added quantity of the original gaseous mixture to an auxiliary rectification to separate one of the constituents as a gas in substantial purity, introducing the remaining portion of the first mentioned liquid to the auxiliary rectification, vaporizing the liquid product of the auxiliary rectification and introducing the resulting vapor to the primary rectification.

5. The method of separating the constituents of gaseous mixtures, which comprises rectifying a liquid containing the constituents of the gaseous mixture to form a liquid consisting of one of the constituents in substantial purity, withdrawing and recompressing the effluent from the primary rectification with an added quantity of the original gaseous mixture, liquefying the recompressed effluent and gaseous mixture, subjecting the liquid produced to an auxiliary rectification, vaporizing the liquid product of the auxiliary rectification and introducing the resulting vapor to the primary rectification.

6. The method of separating the constituents of gaseous mixtures, which comprises compressing, cooling and liquefying the gaseous mixture, rectifying a portion of the liquid to form another liquid consisting of one of the constituents in substantial purity, withdrawing and recompressing the effluent from the primary rectification, liquefying the recompressed effluent, subjecting the liquid produced to an auxiliary rectification, introducing the remaining portion of the first mentioned liquid to the auxiliary rectification, vaporizing the liquid product of the auxiliary rectification and introducing the resulting vapor to the primary rectification.

7. The method of separating the constituents of gaseous mixtures, which comprises compressing, cooling and liquefying the gaseous mixture, rectifying a portion of the liquid to form another liquid consisting of one of the constituents in substantial purity, withdrawing and recompressing the effluent from the primary rectification with an added quantity of the original gaseous mixture, liquefying the recompressed effluent and gaseous mixture, subjecting the liquid produced to an auxiliary rectification, introducing the remaining portion of the first mentioned liquid to the auxiliary rectification, vaporizing the liquid product of the auxiliary rectification and introducing the resulting vapor to the primary rectification.

8. In an apparatus for separating the constituents of gaseous mixtures, the combination of primary and auxiliary rectification columns, means for delivering the gaseous mixture to the primary column, means connected to the primary column and to an external source for delivering another gaseous mixture to the auxiliary column, and means to convey a gaseous product of the auxiliary column to the primary column and means for withdrawing two constituents of the gaseous mixture respectively from the primary and auxiliary columns.

9. In an apparatus for separating the constituents of gaseous mixtures, the combination of primary and auxiliary rectification columns, means for delivering the gaseous mixture to the primary column, means for delivering another gaseous mixture to the auxiliary column, means to liquefy a portion of the first mentioned gaseous mixture, means to deliver portions of the liquid to both columns, and means to convey a gaseous product of the auxiliary column to the primary column and means for withdrawing two constituents of the gaseous mixture respectively from the primary and auxiliary columns.

10. In an apparatus for separating the constituents of gaseous mixtures, the combination of primary and auxiliary rectification columns, means for delivering the gaseous mixture to the primary column, means for delivering the effluent from the primary column to the auxiliary column, means to liquefy a portion of the gaseous mixture, means to deliver portions of the liquid to both columns, and means to convey a gaseous product of the auxiliary column to the primary column and means for withdrawing two constituents of the gaseous mixture respectively from the primary and auxiliary columns.

In testimony whereof we affix our signatures.

CLAUDE C. VAN NUYS.
JOSEPH L. SCHLITT.